United States Patent
Liverance et al.

(10) Patent No.: US 10,110,594 B2
(45) Date of Patent: Oct. 23, 2018

(54) HEADER SECTION DOWNLOAD OF PACKAGE

(71) Applicant: Hewlett-Packard Development Company, L.P., Houston, TX (US)

(72) Inventors: Fletcher Liverance, Kent, OH (US); Daryl T Poe, Fort Collins, CO (US); Matthieu Clemenceau, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 4 days.

(21) Appl. No.: 14/916,332

(22) PCT Filed: Sep. 4, 2013

(86) PCT No.: PCT/US2013/058064
§ 371 (c)(1),
(2) Date: Mar. 3, 2016

(87) PCT Pub. No.: WO2015/034490
PCT Pub. Date: Mar. 12, 2015

(65) Prior Publication Data
US 2016/0197912 A1    Jul. 7, 2016

(51) Int. Cl.
| | | |
|---|---|---|
| H04L 29/06 | (2006.01) | |
| G06F 21/00 | (2013.01) | |
| H04L 29/08 | (2006.01) | |
| G06F 8/61 | (2018.01) | |
| G06F 8/65 | (2018.01) | |

(52) U.S. Cl.
CPC ............ *H04L 63/0823* (2013.01); *G06F 8/61* (2013.01); *G06F 8/65* (2013.01); *G06F 21/00* (2013.01); *H04L 63/126* (2013.01); *H04L 67/06* (2013.01); *H04L 67/34* (2013.01); *H04L 69/22* (2013.01)

(58) Field of Classification Search
CPC ...... H04L 63/0823; H04L 63/08; H04L 67/34
See application file for complete search history.

(56) References Cited

U.S. PATENT DOCUMENTS

| | | | |
|---|---|---|---|
| 7,194,730 B2 | 3/2007 | Pramberger | |
| 7,568,195 B2 | 7/2009 | Markley et al. | |
| 7,614,079 B2 * | 11/2009 | Bons | H04L 63/0428 |
| | | | 713/150 |

(Continued)

FOREIGN PATENT DOCUMENTS

| | | |
|---|---|---|
| CN | 1551562 | 12/2004 |
| CN | 102656852 | 9/2012 |

(Continued)

OTHER PUBLICATIONS

PCT International Search Report and Written Opinion, dated May 27, 2014, PCT Application No. PCT/US2013/058064, Korean Intellectual Property Office, 13 pages.

(Continued)

*Primary Examiner* — Jason K Gee
(74) *Attorney, Agent, or Firm* — Trop, Pruner & Hu PC

(57) ABSTRACT

A header section of a package may be downloaded from a server. The header section may be analyzed to determine if a data section of the package is secure and a correct version. The data section of the package is downloaded, if the data section is secure and the correct version. The package is a single file.

16 Claims, 4 Drawing Sheets

(56) References Cited

U.S. PATENT DOCUMENTS

| | | | |
|---|---|---|---|
| 8,364,845 B2 | 1/2013 | Richter | |
| 2003/0023839 A1* | 1/2003 | Burkhardt | G06F 9/4416 |
| | | | 713/1 |
| 2004/0255114 A1 | 12/2004 | Byung-Rae et al. | |
| 2008/0127170 A1* | 5/2008 | Goldman | G06F 8/61 |
| | | | 717/174 |
| 2009/0199007 A1* | 8/2009 | Adams | H04L 63/0442 |
| | | | 713/175 |
| 2009/0282399 A1* | 11/2009 | Kamrowski | G06F 8/68 |
| | | | 717/174 |
| 2011/0119434 A1 | 5/2011 | Brown | |
| 2012/0220374 A1 | 8/2012 | Arbogast et al. | |

FOREIGN PATENT DOCUMENTS

| | | |
|---|---|---|
| KR | 10-2007-0041155 A | 4/2007 |
| WO | WO 02/41525 A1 * | 5/2002 |
| WO | WO-0241525 | 5/2002 |
| WO | WO-2006118823 A2 | 9/2006 |

OTHER PUBLICATIONS

Zooey, "Package Management for Haiku," Jan. 3, 2011, pp. 1-35, Zooey's Blog, Available at: <haiku-os.org/blog/zooey/2011-01-03_package_management_haiku?page=1>.
European Patent Office, European Search Report for Appl. No. 13893192.8 dated Jul. 27, 2016 (4 pages).

* cited by examiner

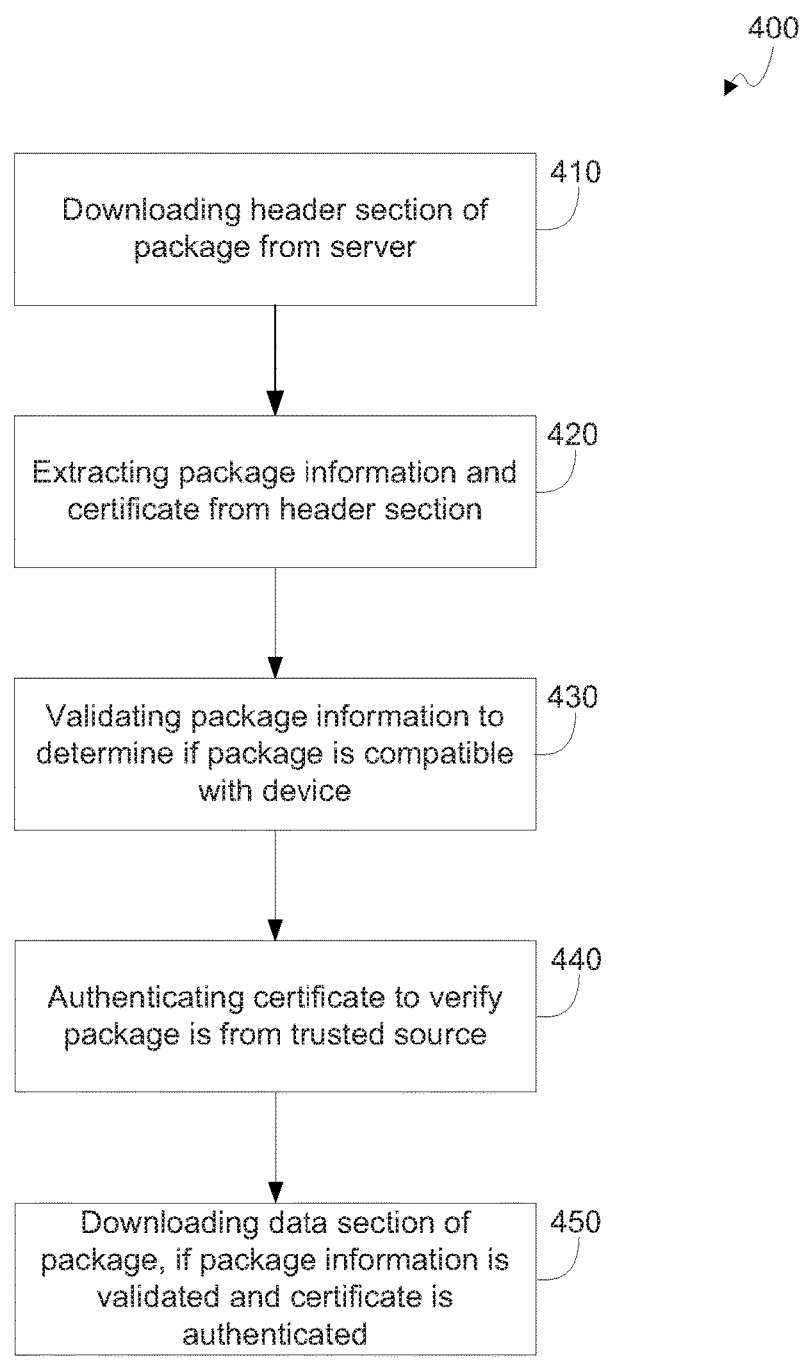

HEADER SECTION DOWNLOAD OF PACKAGE

CROSS-REFERENCE TO RELATED APPLICATION

This application is a U.S. National Stage Application of and claims priority to International Patent Application No. PCT/US2013/058064, filed on Sep. 4, 2013, and entitled "HEADER SECTION DOWNLOAD OF PACKAGE," which is hereby incorporated by reference in its entirety.

BACKGROUND

A device may require a remote update, such as an update to software or firmware. A server may provide an executable package to the device in order to carry out the update. Different types of devices may require different types of updates at different times. Manufacturers, vendors and/or suppliers are challenged to provide users of the devices with more efficient and secure methods for providing updates.

BRIEF DESCRIPTION OF THE DRAWINGS

The following detailed description references the drawings, wherein:

FIG. 4 is an example flowchart of a method for downloading a header section of a package.

DETAILED DESCRIPTION

Figure 1:
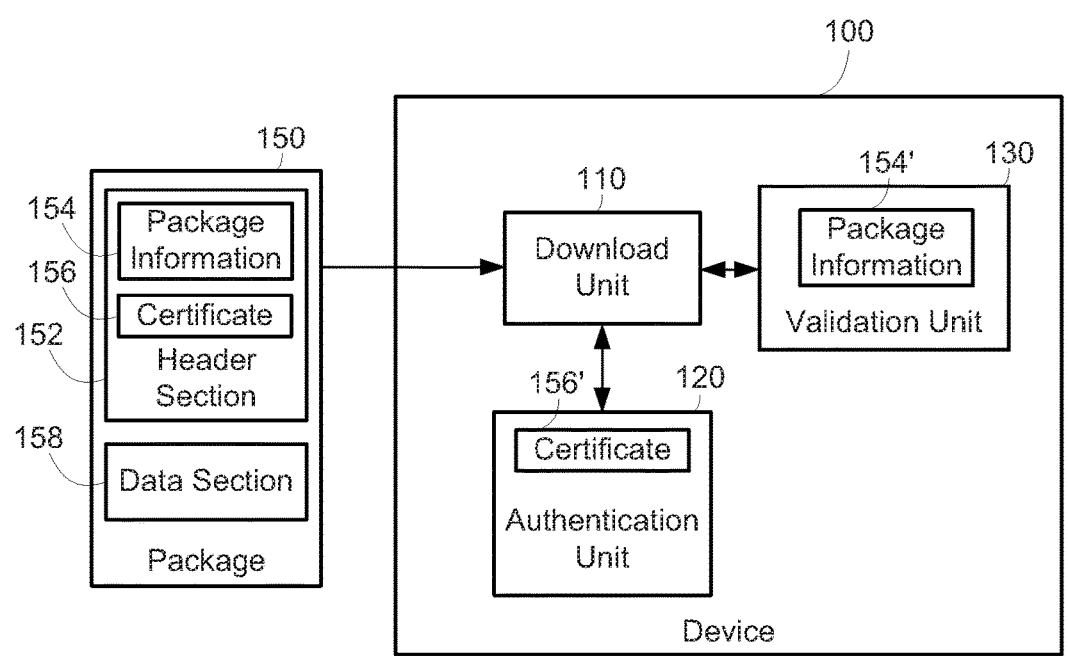
FIG. 1 is an example block diagram of a device to download a header section of a package.

Specific details are given in the following description to provide an understanding of examples of the present techniques. However, it will be understood that examples of the present techniques may be practiced without these specific details. For example, systems may be shown in block diagrams in order not to obscure examples of the present techniques in unnecessary detail. In other instances, well-known processes, structures and techniques may be shown without unnecessary detail in order to avoid obscuring the examples of the present techniques.

A client may initially be given an image for a device. Subsequently, the client may need to be given updates remotely for the device. Current options for providing the updates may be through package formats such as .deb, .rpm and .tar.gz. However, these formats may not allow for remote type checking via HTTP or FTP because a header section (which includes information about the package) and a data section of a package are bundled without a clear separation point. Thus, the client may have issues downloading the correct version of the package. Further, these formats may not have any inherent way to check for authenticity, thus raising security issues. While the package may be signed in some cases, a separate signature file must be present along with the package, making it difficult for support staff to maintain and distribute.

Further, packages of these formats may not be inherently scriptable because after data of the package is unpacked, only a predetermined set of functions may be run on the data to install it. Also, while this type of package may have a separate XML file associated with it that gives a description of the package, the XML file itself cannot be authenticated. Thus, these formats do not allow for remote type-checking via a single file or for a secure download. While other update solutions, such as web based solutions (like apt, windows update, android firmware) may provide remote type-checking, the update cannot occur via a single file.

Examples may provide a secure packaging format contained within a single file with a defined separation point between variable length header and data sections. An example device may include a download unit, a validation unit and an authentication unit. The download unit may download a header section of a package. The validation unit may analyze package information extracted from the header section. The package information may include information about a data section of the package. The authentication unit may analyze a certificate extracted from the header section. The certificate may verify a source of the data section. The download unit may download the data section of the package, if the package information is validated and the certificate is authenticated. The package is contained within a single file.

Hence, examples of present techniques may provide a new packaging format that contains a parsable XML header section, which can be downloaded and checked independently of the data section. That data section may contain multiple sub packages (such as .deb, tar.gz, .rpm, or individual files) that can be unpacked in an arbitrary, scriptable fashion. Examples of the package may be capable of having an SSL signed data section to prove authenticity, and be created in the field or on site. By being contained in a single file, examples of the package may allow for simplified distribution and sharing amongst distribution partners, customers and support staff.

Referring now to the drawings, FIG. 1 is an example block diagram of a device 100 to download a header section 152 of a package 150. The device 100 may couple to or be included in any type of computing device to receive remote updates, such as a notebook computer, a desktop computer, an all-in-one system, a server, a network device, a wireless device, a storage device, a mobile device, a thin client, a retail point of sale device, a gaming device, a scientific instrument, and the like.

In the example of FIG. 1, the device 100 includes a download unit 110, an authentication unit 120 and a validation unit 130. The download, authentication and validation units 110, 120 and 130 may include, for example, a hardware device including electronic circuitry for implementing the functionality described below, such as control logic and/or memory. In addition or as an alternative, the download, authentication and validation units 110, 120 and 130 may be implemented as a series of instructions encoded on a machine-readable storage medium and executable by a processor.

The download unit 110 may download a header section 152 of a package 150. The package 150 is a single file containing a collection of data or information, such as the header section 152 and a data section 158. The header section 152 may follow a clear and unambiguous specification or format, to allow for parsing, such as according to an Extensible Markup Language (XML) format.

The validation unit 130 may analyze package information 154 extracted from the header section 152. The package information 154 may include information about a data section 158 of the package 150, such as metadata, installation requirements or compatibility, and the like. Example package information 154 may include information about an operating system (OS) type, a hardware dependency for installation of the package a software dependency for installation of the package, a localized title, a version, a description of the data section 158, release notes, and any other data that may identify whether the package 150 should be installed.

Thus, the validation unit 130 may validate the package information 154 if the package information 154 matches a specification of the device 100. For example, the validation process may include ensuring that a type of OS listed in the package information 154 matches an OS installed on the device 100, that a version of the package 150 listed in the package information 154 is greater than that of a package currently installed on the device 100, that the data section 158 includes the desired data or software, and the like.

The authentication unit 120 may analyze a certificate 156' extracted from the header section 152. The certificate 156' may verify a source of the data section 158. For example, the package 150 may be downloaded by the device 100 according to the Secure Socket Layer (SSL) protocol. In this case, a server (not shown) providing the package 150 may include a signed certificate 156' in the header section 152. The authentication unit 120 may check that the certificate 156' was issued by a trusted party, such as a trusted root Certification Authority (CA), that the certificate 156' is still valid and/or that the certificate 156' is related to a site contacted by the device 100.

The download unit 110 may download the data section 158 of the package 150, if the package information 154 is validated and the certificate is authenticated. Hence, the device 100 may be able to securely, such as via SSL, determine whether the data section 158 of the package 150 should be downloaded by first downloading the header section 152 of the package 150. The header section 152 is parsable and downloadable independently of the data section 158. Yet the header and data sections 152 and 158 are part of a single file or package 150, thus reducing a likelihood that the header section 152 could be tampered with independently of the data section 158.

Figure 2:
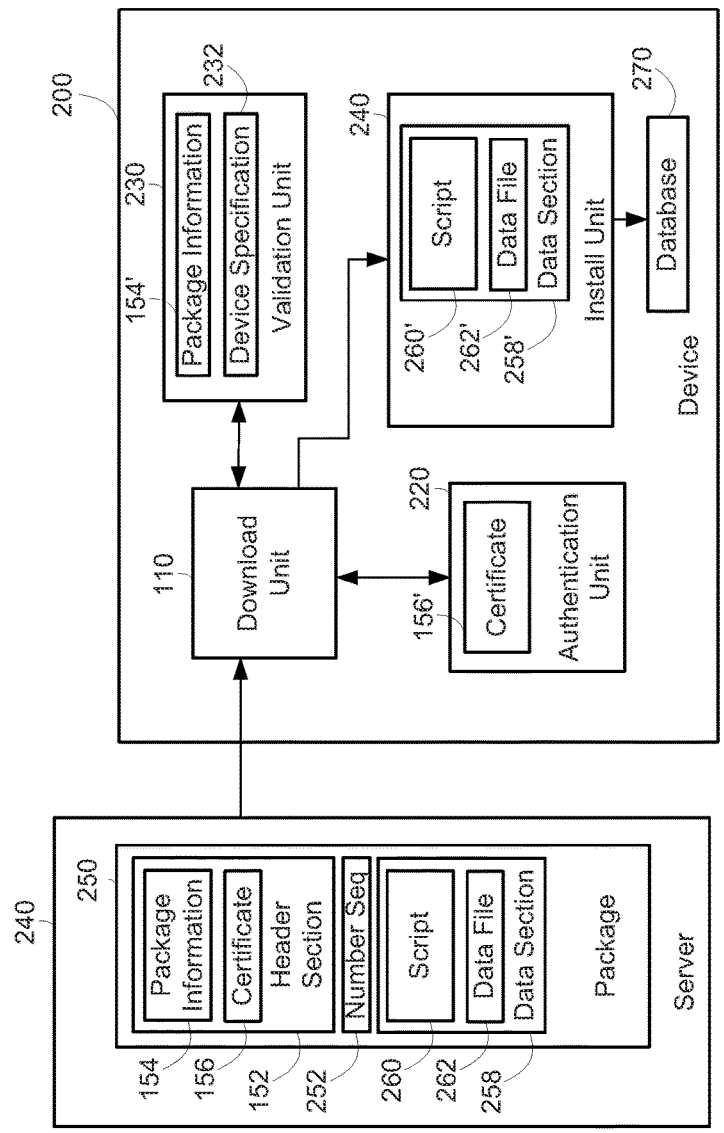
FIG. 2 is another example block diagram of a device to download a header section of a package.

FIG. 2 is another example block diagram of a device 200 to download a header section 152 of a package 250. The device 200 may couple to or be included in any type of computing device receive remote updates, such as a controller, a notebook computer, a desktop computer, an all-in-one system, a server, a network device, a wireless device, a storage device, a mobile device, a thin client, a retail point of sale device, a gaming device, a scientific instrument, and the like.

The device 200 of FIG. 2 may include at least the functionality and/or hardware of the device 100 of FIG. 1. For example, the device 200 of FIG. 2 includes the download unit 110. Further, the authentication and validation units 220 and 230 of the device 200 may include at least the functionality and/or hardware of the authentication and validation units 120 and 130 of the device 100. The device 200 is further shown to include an install unit 240 and a database 270.

The install unit 240 may include, for example, a hardware device including electronic circuitry for implementing the functionality described below, such as control logic and/or memory. In addition or as an alternative, the install unit 240 may be implemented as a series of instructions encoded on a machine-readable storage medium and executable by a processor. The database 270 may be any electronic, magnetic, optical, or other physical storage device that is able to store data persistently, such as a HDD, SDD and/or flash memory.

In addition, the device 200 interfaces with a server 240. The server 240 may be any type of system or device that communicates across a network to provide, or help to provide, a network service. Example types of servers 240 may include a database server, file server, mail server, print server, web server, gaming server, application server, or some other kind of server.

The download unit 110 may determine a separation point between the header and data sections 152 and 258 based on a number sequence 252 included in the package 250. The number sequence 252 may be any sequence or patter of numbers uniquely identifiable by the download unit 110, such as a repeating sequence of "1010". The download unit 110 may pause a download of the package 250 after the number sequence 252 is downloaded, as this will signal an end of the header section 152. The download unit 110 may resume a download of the package 250 after the package information 252 is validated and the certificate 156' is authenticated, in order to download the data section 258. As shown in FIG. 2 the validation unit 230 may compare the package information 154' to the device specification 232, in order to determine whether to validate the package information 154'. The certificate 156' analyzed by the authentication unit 220 may be signed by the server 240, such as via a pretty good privacy (pgp) signature.

The data section 258 is shown to include at least one data file 262 and a script 260. Example data files 262 may include multiple sub packages such as .deb, tar.gz, .rpm and the like, or individual files. The data file(s) 262 may in any format. As the data file(s) 262 may all be managed and installed by the installation script 260', it may not be necessary to have any restrictions on file format. For instance, the data file 262 may span in range from a basic file to be unzipped to an OS to be rebooted or installed.

The install unit 240 may install the package 250 after the data section 258 is downloaded. The install unit 240 may run the script 260 to install and/or unpack the data file 262. The install unit 240 may decompress the data file 262 before the script 260 is run, such as to a temporary location like Random Access Memory (RAM) (not shown). The package 250 may itself, for example, be in the .xar format or any other format that allows for the capabilities described herein.

For example, the script 260 may include generic package installation functions to run common unpacking tasks such as unzip, tar, dpkg, rar etc., and/or the script 260 may be customized to the data file 262 using a programming language such as Bash, Perl, Java, Python, complied C code or even pre-compiled binary. The script 260 may be run with permission to at least one of read, modify and execute a data component (not shown) of the device 200 and execute system calls of the device 200 with administrator privileges. After the package 250 is installed, the install unit 20 may mark the package 250 as installed in the database 270.

Figure 3:
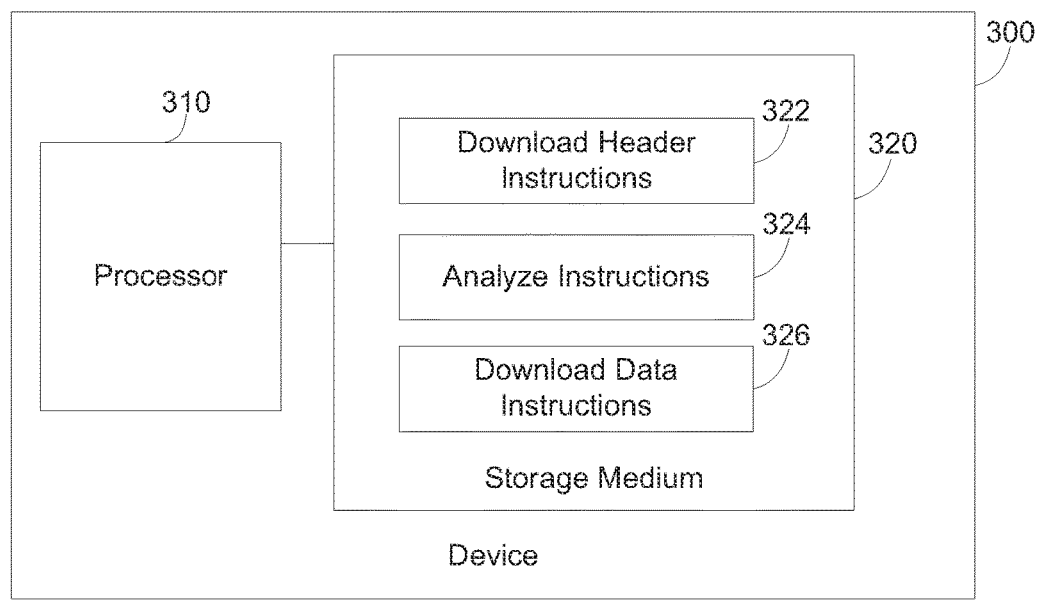
FIG. 3 is an example block diagram of a computing device including instructions for downloading a header section of a package.

FIG. 3 is an example block diagram of a computing device 300 including instructions for downloading a header section of a package. In FIG. 3, the computing device 300 includes a processor 310 and a machine-readable storage medium 320. The machine-readable storage medium 320 further includes instructions 322, 324 and 326 for downloading a header section of a package.

The computing device 300 may be, for example, a controller, a secure microprocessor, a notebook computer, a desktop computer, an all-in-one system, a server, a network device, a wireless device, or any other type of user device capable of executing the instructions 322, 324 and 326. In certain examples, the computing device 300 may include or be connected to additional components such as memories, sensors, displays, etc.

The processor 310 may be, at least one central processing unit (CPU), at least one semiconductor-based microprocessor, other hardware devices suitable for retrieval and execution of instructions stored in the machine-readable storage medium 320, or combinations thereof. The processor 310 may fetch, decode, and execute instructions 322, 324 and 326 to implement downloading the header section of the package. As an alternative or in addition to retrieving and executing instructions, the processor 310 may include at least one integrated circuit (IC), other control logic, other electronic circuits, or combinations thereof that include a number of electronic components for performing the functionality of instructions 322, 324 and 326.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for downloading the header section of the package.

Moreover, the instructions 322, 324 and 326 when executed by a processor (e.g., via one processing element or multiple processing elements of the processor) can cause the processor to perform processes, such as, the process of FIG. 4. For example, the download header instructions 322 may be executed by the processor 310 to download a header section of a package from a server (not shown). The analyze instructions 324 may be executed by the processor 310 to analyze the header section to determine if a data section of the package is secure and a correct version.

The download data instructions 326 may be executed by the processor 310 to download the data section of the package, if the data section is secure and the correct version. The package is a single file and so the header and data section may also be part of a single file. The downloaded data section may include a data file and a script. The data file may be installed according to the script. A database may be updated to mark the data file as installed.

FIG. 4 is an example flowchart of a method 400 for downloading a header section of a package. Although execution of the method 400 is described below with reference to the device 200, other suitable components for execution of the method 400 can be utilized, such as the device 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the device 200 downloads a header section 152 of a package 250 from a server 240. The device 200 may receive a uniform resource locator (URL) from the server 240 to download the package 250. Further, when downloading the header section 152, the device 200 may pause downloading the package 250 after a number sequence 252 after an end of the header section 152 is downloaded.

Then, at block 420, the device 200 extracts package information 154' and a certificate 156' from the header section 152. Next, at block 430, the device 200 validates the package information 154' to determine if the package 250 is compatible with the device 200. At block 440, the device 200 authenticates the certificate 156' to verify that the package 250 is from a trusted source. Lastly, the block 450, the device 200 downloads a data section 258 of the package 250, if the package information 154' is validated and the certificate 156' is authenticated.

The validating at block 430 may include displaying the package information 154' to a user of the device 200, such as via a user interface like a monitor. The package information 154' may include a contents and/or installation requirements of the data section 258. The downloading at block 450 may further resume downloading the package 250 if the user approves downloading the data section 258 after the package information 154 is displayed. For instance, the user may review the contents or installation requirements to ensure that the correct package 250 is being downloaded.

We claim:

1. A device, comprising:
a processor; and
a non-transitory storage medium storing instructions executable on the processor to:
download a header section of a package contained within a single file;
determine a separation point between the header section and a data section of the package based on a specified sequence included in the package, wherein the specified sequence includes a sequence of repeating numbers;
pause a download of the package in response to detecting the specified sequence and after the specified sequence is downloaded;
analyze package information extracted from the header section, the package information including information about the data section of the package;
analyze a certificate extracted from the header section, the certificate to verify a source of the data section; and
if the package information is validated and the certificate is authenticated, resume a download of the package to download the data section of the package.

2. The device of claim 1, wherein the analyzing of the certificate comprises verifying a certification authority (CA) of the certificate.

3. The device of claim 1, wherein the instructions are executable on the processor to validate the package information if the package information matches a specification of the device.

4. The device of claim 3, wherein the package information includes information about at least one of an operating system (OS) type, a hardware dependency for installation of the package, a software dependency for installation of the package, a localized title, a version, a description of the data section, or release notes.

5. The device of claim 1, wherein the instructions are executable on the processor to:
install the package after the data section is downloaded by running an installation script in the data section, the installation script when run to install data of the data section.

6. The device of claim 5, wherein the instructions are executable on the processor to:
decompress the data before the installation script is run; and mark the package as installed in a database, after the package is installed.

7. The device of claim 5, wherein:
the installation script is customizable based on the data, and
the installation script is to be run with permission to at least one of read, modify, or execute a data component and execute system calls with administrator privileges.

8. The device of claim 1, wherein:
the header section is parsable and downloadable independently of the data section, and
the instructions are executable on the processor to download the package according to a Secure Socket Layer (SSL) protocol.

9. The device of claim 5, wherein the installation script includes instructions to unpack the data, and the installation script is customized for the data.

10. A method, comprising:
downloading, to a device, a header section of a package from a server, wherein a downloading of the package pauses responsive to detecting a specified sequence after an end of the header section is downloaded, wherein the specified sequence includes a sequence of repeating numbers;
extracting package information and a certificate from the header section;
validating the package information to determine if the package is compatible with the device;
authenticating the certificate to verify the package is from a trusted source; and
resuming, by the device, the downloading of the package, in response to the validating of the package information and the authenticating of the certificate, to download a data section of the package.

11. The method of claim 10, further comprising:
receiving, by the device, a uniform resource locator (URL) from the server to download the package.

12. The method of claim 10, wherein:
the validating includes displaying the package information to a user of the device, the package information to include at least one of contents r installation requirements of the data section, and
wherein the resuming of the downloading of the package is further in response to the user approving downloading the data section after the package information is displayed.

13. The method of claim 10, wherein the downloaded data section of the package includes a data file and an installation script, the method further comprising:
running the installation script to install the data file.

14. The method of claim 13, wherein the installation script includes instructions to unpack the data file, and the installation script is customized for the data file.

15. A non-transitory computer-readable storage medium storing instructions that, if executed by a device, cause the device to:
download a header section of a package from a server, the package being a single file;
pause a download of the package in response to detecting a specified sequence after an end of the header section of the package, wherein the specified sequence includes a sequence of repeating numbers;
analyze the header section to validate the package and determine if a data section of the package is secure;
resume the download of the package to download the data section in response to determining that the package is validated and the data section is secure, wherein the downloaded data section includes data and an installation script; and
run the installation script to install the data.

16. The non-transitory computer-readable storage medium of claim 15, wherein the instructions if executed cause the device to:
update a database to mark the data as installed.

* * * * *

UNITED STATES PATENT AND TRADEMARK OFFICE
CERTIFICATE OF CORRECTION

PATENT NO. : 10,110,594 B2
APPLICATION NO. : 14/916332
DATED : October 23, 2018
INVENTOR(S) : Fletcher Liverance et al.

Page 1 of 1

It is certified that error appears in the above-identified patent and that said Letters Patent is hereby corrected as shown below:

In the Claims

In Column 8, Claim 12, Line 4, delete "r" and insert -- or --, therefor.

Signed and Sealed this
Fifth Day of March, 2019

Andrei Iancu
*Director of the United States Patent and Trademark Office*